United States Patent [19]
Johnston

[11] 3,753,445
[45] Aug. 21, 1973

[54] WASHING, FILLING AND TAPPING VALVE ASSEMBLY

[76] Inventor: Mack S. Johnston, 26 Hitching Post Drive, Rolling Hills, Calif. 90274

[22] Filed: Feb. 2, 1972

[21] Appl. No.: 222,910

[52] U.S. Cl............................. 137/322, 222/148
[51] Int. Cl......................... F16l 55/10, B65d 83/14
[58] Field of Search............................137/315, 137/320, 317, 321, 322, 323, 212; 251/65, 318; 222/148, 399, 400.7, DIG. 1

[56] References Cited
UNITED STATES PATENTS

| | | | |
|---|---|---|---|
| 3,498,313 | 3/1970 | Belich | 137/322 |
| 3,596,809 | 8/1971 | Taubenheim | 137/212 X |

*Primary Examiner*—Martin P. Schwadron
*Assistant Examiner*—David R. Matthews
*Attorney*—Charles E. Wills et al.

[57] ABSTRACT

A valve assembly especially suitable for mounting in the bung opening in the side wall of a beer keg, and containing a skeletal tubular housing and a siphon tube which extends into said keg. A valve body is mounted in the tubular housing for movement between a closed position in which it is in closed, sealing engagement with the bung opening, and an open position in which it is spaced from the bung opening to permit cleaning liquid or beer to flow past the valve body and into the keg, said valve body being yieldably biased toward the closed position. Liquid and gas passageways with associated valve means are provided in the valve body, whereby gas under pressure can be admitted into the keg and beer can be withdrawn therefrom when the valve body is in the aforesaid closed position, as by using a tapper attachment.

12 Claims, 8 Drawing Figures

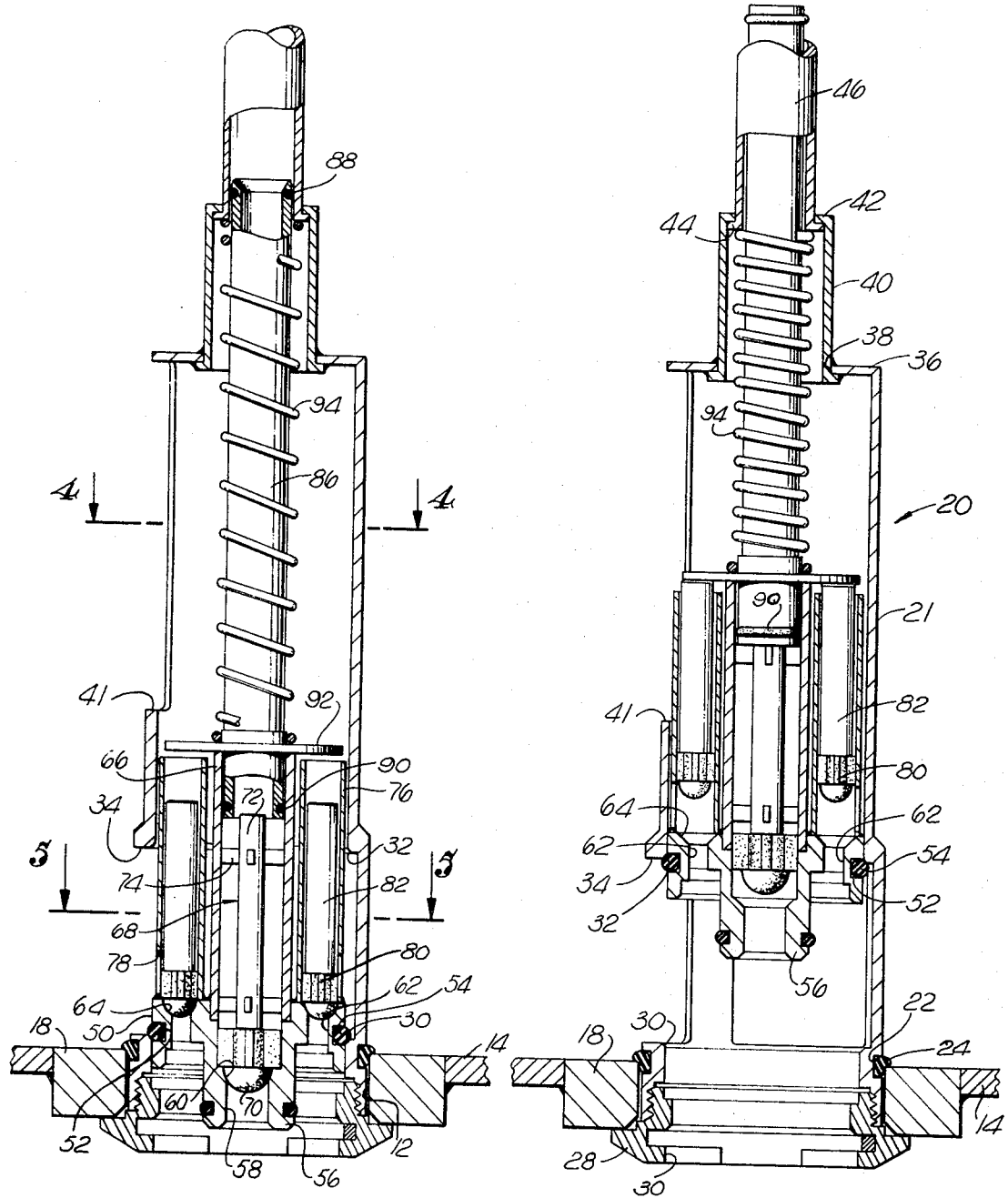

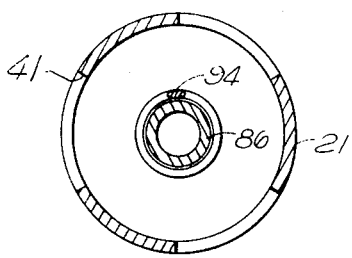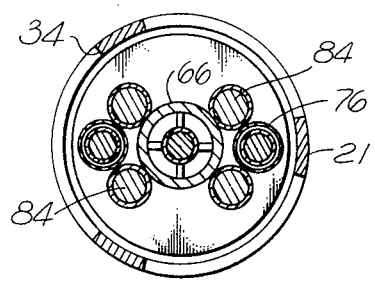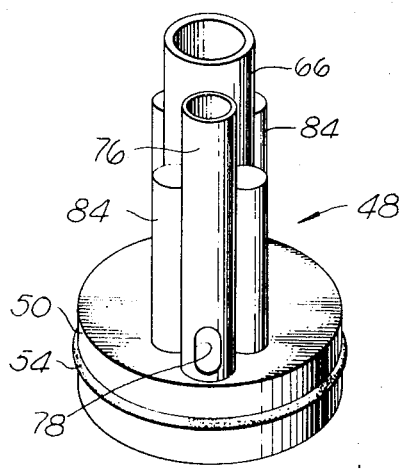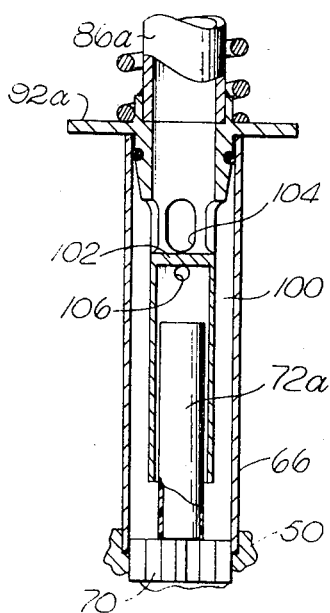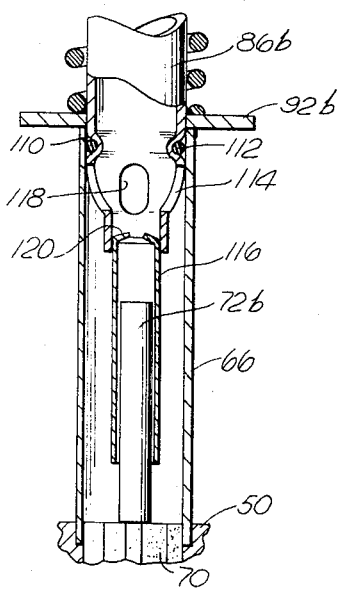

WASHING, FILLING AND TAPPING VALVE ASSEMBLY

BACKGROUND OF THE INVENTION

The present invention relates generally to the siphoning art, and more particularly to a novel washing, filling and tapping valve assembly especially suitable for beer kegs, whereby the same valve assembly can be used for admitting liquid into the keg for cleaning purposes, thereafter admitting beer into the keg which is to be subsequently dispensed therefrom, and for withdrawing the beer from the keg.

For many years and up to the present time, all commercial beer kegs have been filled through an opening in a side wall, which opening is then closed with a wooden bung or plug.

Also, up until relatively recent times, the beer was dispensed from the keg by removing the aforementioned bung and inserting an elongated tap rod assembly which had a siphoning device associated therewith, means also being provided to inject compressed air or carbon dioxide gas into the keg through the tap rod assembly so as to force the beer out of the keg to a spigot or faucet. After all of the available beer had been withdrawn from the keg, the bartender would then remove the tap rod assembly and siphoning device from the spent keg and repeat the process with a full keg. Inasmuch as the same tap rod assembly and siphoning device were used over and over again, it was necessary for the bartender to frequently clean the units in an effort to remove old yeast deposits and bacteria so as to avoid contaminating the beer in the fresh barrel.

Another problem with the aforementioned draft system was that the spent or empty kegs had an opening in one wall thereof from which the bung had been removed, which opening permitted all kinds of foreign matter and things to enter the keg. Also, the small amount of beer remaining in the keg would evaporate and leave a hard, dry coating which is difficult to remove. Consequently, the cleaning of these kegs at the brewery prior to refilling was a laborious and costly process.

Being familiar with the aforementioned problems, I invented various beer tapping assemblies which included a keg adapter mounted in the end wall of the keg and containing a spring-biased valve which remained closed to prevent the escape of beer, unless and until a tapper was engaged with the adapter and actuated to cause a tap rod to unseat the aforementioned valve and permit the beer to flow therefrom under pressure from a source of compressed air or carbon dioxide gas which was connected to the tapper. Various forms of my aforementioned adapter and tapper assembly are described in U.S. Pat. No. 3,231,154 issued Jan. 25, 1966, U.S. Pat. No. 3,353,724 issued Nov. 21, 1967, U.S. Pat. No. 3,410,458 issued Nov. 12, 1968, U.S. Pat. No. 3,435,997 issued Apr. 1, 1969, U.S. Pat. No. 3,497,114 issued Feb. 24, 1970, U.S. Pat. No. 3,563,424 issued Feb. 16, 1971, and U.S. Pat. No. 3,567,080 issued Mar. 2, 1971.

Although the various forms of adapter and tapper assemblies shown and described in the aforementioned patents constituted a considerable advance over prior beer tapping devices, they continued to present problems with regard to satisfactorily washing the keg adapter and the interior of the keg while the adapter remained fastened in the keg, and prior to the refilling of the keg with beer.

Recognizing the aforementioned problems, I invented a novel tapping assembly in which the valves in the keg adapter are yieldably biased toward the closed position by actuators which include permanent magnets. Thus, while the permanent magnets have sufficient holding force to maintain the gas and liquid valves in the adapter in the closed position during the shipment of a beer-filled keg, the valves are readily unseated when the tapper is installed for withdrawing the beer from the keg, and they are also unseated when a water hose is connected to the adapter during the washing operation with precedes the filling of the keg with beer through the aforementioned bunghole in the side wall. The aforementioned novel tapping assembly is shown and described in my copending application, Ser. No. 189,281, filed Oct. 14, 1971.

However, as mentioned hereinabove, kegs continued to be filled with beer through an opening in the side wall, which opening is subsequently closed with a wooden bung or plug. This presents several problems. Prior to washing and refilling the keg with beer, the old wooden plug or bung is removed with a special screw augar which cuts into the bung and pulls it out of the opening. However, often times the bung will split into pieces and such pieces and chips will fall into the keg, thereby requiring special efforts to remove the pieces and chips and a further inspection to make certain that all have been removed.

The keg then passes to the washing rack where it is washed and inspected and then turned on its side with the bung hole directed downwardly, to permit all water and caustic cleaner to drain from the keg.

When the keg has been washed and is in transit to the racking room where the keg is to be filled with beer, the bunghole remains open, with the possiblity that foreign matter might fall into the keg and contaminate the beer which is subsequently introduced into the keg.

At the filling station, it is again necessary to change the position of the keg in order to have the bunghole at the top, to permit the keg to be filled with beer.

After a keg has been filled with beer by means of a filling rod which is inserted through the aforementioned bunghole, the hole is closed with a wooden plug or bung which is usually manually driven into place with a sledge hammer. If the first bung does not effectly close the opening, it is not uncommon to place a second bung on top of the first one, and to drive the first bung into the keg. There might be dirt and bacteria on the outer face of the first bung where the sledge hammer struck it, and this could also contaminate the beer.

Obviously, the manual removal of a bung from an empty keg, with the accompanying inspection to make certain that all chips have been removed, the washing and draining of the keg, the turning of the keg and the filling of it with beer, and the manual driving of a bung into the hole after the keg has been filled with beer . . . are very time comsuming operations and materially add to the cost of a keg of beer. At the present time, there are from eight to ten steps in debunging, cleaning, filling and sealing a keg of beer, with most modern breweries having a capacity of from about 160 to 350 kegs per hour.

Also, an additional major problem occurs after the bung has been driven into the opening and the key has been removed from the racking room, because it is expected that anywhere from 0.5 percent to 1.0 percent of the kegs will leak around the bung. If such "leakers" are detected in the storage room, it is necessary to remove and replace the old bung, but many such "leakers" are not detected in the storage room or they begin to leak during transit, with the result that they are rejected at the tavern, and must be returned to the brewery and the contents dumped.

With the aforementioned limitations and deficiencies of prior filling and tapping equipment and methods in mind, it is an object of the present invention to dispense with the filling of beer kegs through an opening which is subsequently closed with a wooden bung or plug and to dispense the beer from a separate and different opening. More particularly, it is an object to provide a novel valve assembly for insertion in an opening in a keg, which valve assembly can be used for both filling the keg with beer and for withdrawing the beer therefrom. Specifically, it is an object to provide a novel valve assembly for use with the existing bunghole in the side wall of a keg, which provides means for introducing cleaning fluids into the keg prior to refilling the keg with beer, which provides means for filling the keg with beer, and which further provides means for subsequently admitting compressed air or gas into the keg and for the withdrawing of the beer therefrom at a restaurant or tavern.

A further object is to provide such a valve assembly which reduces the number of cleaning and filling stations in a brewery, from eight or twelve to about four with an accompanying reduction in operating and inspecting personnel. More particularly, it is an object to provide such a valve assembly whereby a keg can remain in the same relative position for washing, draining, inspecting, and filling, i.e., with the keg on its side and with the bunghole directed downwardly, whereby the draft beer producing capacity of the present brewery can be increased to well over 400 kegs per hour with less equipment than in use at the present time.

Another object of the present invention is to provide such a washing, filling and tapping valve assembly which is of simple but rugged construction, and which is relatively inexpensive to manufacture.

A further object of the present invention is to provide a washing, filling and tapping valve assembly in which the various passageways are of simple configuration, the moving parts are few in number and the various parts are easily contacted by cleaning liquid, whereby the assembly can be easily and thoroughly cleaned while in place in the keg.

I have discovered that the foregoing objects and advantages are achieved by a novel valve assembly which is especially suitable for mounting in the present bung opening contained in the side wall of a keg, and which includes an elongated skeletal tubular housing with an associated siphon tube which extends into the interior of a keg. A valve body is mounted in the housing for limited axial movement between a closed position in which it is in closed, sealing engagement with the bung opening, and an open position in which it is positioned away from the opening. The valve body is yieldably biased toward the closed position, as for example, by a coiled spring. The housing adjacent to the bung opening is of a size to slidably receive the valve body and contains large apertures in the side wall thereof, whereby when the valve body is in the open position, cleaning liquid or beer can freely flow into the interior of the keg. Gas and liquid passageways with associated valve means are provided in the valve body, and a siphon tube is provided in the keg in communication with the liquid passageway in the valve body, whereby when the valve body is in the closed position, gas under pressure can be admitted to the interior of the keg and liquid can be withdrawn therefrom through the siphon tube. In the preferred construction, the valve body is made of a magnetic material such as stainless steel, and the valve means associated with the liquid and gas passageways are biased toward the closed position by permanent magnets, whereby said passageways will be opened by the flow of liquid into the tubular housing.

BRIEF DESCRIPTION OF THE DRAWINGS

In the drawings:

FIG. 1 is a side elevational view of a beer keg with a valve assembly constructed in accordance with the teachings of the present invention mounted in the existing bung opening, the side wall of the keg being cutaway to illustrate the position of the valve assembly within the keg, FIG. 2 is an enlarged, vertical, sectional view of a novel washing, filling and tapping valve assembly of the type shown in FIG. 1, with the valve body in the closed position, FIG. 3 is a vertical, sectional view similar to FIG. 2, but with the valve body in the fully open position, as during the washing or beer filling operation, FIG. 4 is a horizontal, sectional view taken on the line 4—4 in FIG. 2, FIG. 5 is a horizontal, sectional view taken on the line 5—5 in FIG. 2, FIG. 6 is a perspective view of the valve body as shown in FIGS. 2 and 3, with the liquid and gas valve members removed therefrom.

FIG. 7 is an enlarged, fragmentary vertical sectional view of a first modified form of beer valve housing and associated parts, and FIG. 8 is an enlarged, fragmentary, vertical sectional view of a second modified form of beer valve housing and associated parts.

DESCRIPTION OF THE PREFERRED EMBODIMENTS

Although the novel washing, filling and tapping valve assembly of the present invention can be used with numerous types of containers which store and dispense various types of liquids, it is especially suitable for use with kegs which contain draft beer, because of the requirements for ease of cleaning and rapid washing and filling which is necessary with present brewery demands, and accordingly, the valve assembly will be so described.

Referring to the drawings more particularly by reference numerals, the numeral 10 indicates a novel washing, filling and tapping valve assembly embodying the teachings of the present invention, shown installed in a conventional bung opening 12 in the side wall 14 of a beer keg 16, the keg being devoid of any other opening. Although the aforementioned valve assembly can be installed in an opening in an end wall of the keg, an important advantage of the subject valve assembly is that it is especially suitable for use with all present cooperage which contain the common bung opening in the side wall thereof.

As shown in FIGS. 2 and 3, the bung opening 12 is usually surrounded by an annular flange 18 which can be fastened in the side wall 14 of the keg, as by welding.

Positioned in the bung opening 12 is one end of an elongated tubular valve housing 20 having a side wall 21, which contains an external groove 22 for receiving an O-ring 24 which provides a seal between said housing and the bung opening 12. Internal threads 26 are provided in said one end of the valve housing for threadedly receiving a retaining ring 28 which contains an internal annular groove 30 for receiving a tapper of the type described in my co-pending application Ser. No. 189,281.

Adjacent to said one end of the valve housing are opposed, inner annular shoulders 30 and 32 which function as seats for receiving an O-ring sealing member to be more fully described hereinafter. The wall of the housing between said opposed shoulders 30 and 32 contains a plurality of large, rectangular openings 34 to provide for the flow of liquid therethrough.

The other end of the valve housing 20 has an end wall 36 containing an opening 38 which receives one end of a tubular adapter 40 which is fastened thereto, as by welding.

The side wall 21 of the valve housing adjacent to said end wall 36, is also provided with a plurality of relatively large, rectangular openings 41 to provide for the free flow of liquid into and out of said housing.

The other end of the adapter 40 contains an internal flange 42 for receiving an interlocking external flange 44 on the inner end of a siphon tube 46 which extends to adjacent the side wall of the keg, opposite from the bung opening 12.

Mounted within the valve housing 20, is a valve body 48 (FIGS. 2, 3 and 8), preferably made of a magnetic material such as stainless steel, and which includes a cylindrical disc-like end portion 50 containing an external annular groove 52 which receives an O-ring 54, said O-ring being adapted to engage the shoulders 30 and 32 previously described.

Extending from the outer face of the end portion 50 is a bayonet portion 56 (FIGS. 2 and 3) which forms the outer end of an axially extending liquid passageway 58 which contains a valve seat 60. The end of the bayonet portion is provided with an external groove and an O-ring for receiving a tapper to dispense beer from the keg, as described in my co-pending application Ser. No. 189,281.

Two, diametrically opposed gas passageways 62 are provided in the end portion 50, radially outwardly of the liquid passageway 58, each of which gas passageways contains a valve seat 64.

Fastened to the inner face of the end portion 50 in alignment with said liquid passageway 58, is a tubular liquid valve housing 66 (FIG. 6) also of magnetic material such as stainless steel, which receives a liquid valve member 68 comprising a valve element 70 and a permanent magnet valve actuator 72, the latter being provided with radially extending projections 74 for centering the valve member in the valve housing. As shown in FIG. 2, the valve element 70 is adapted to engage the valve seat 60.

Also fastened to the inner face of the end portion 50, but in alignment with the gas passageways 62, are two tubular gas valve housings 76 of stainless steel, which are slightly shorter in length than the liquid valve housing, for a purpose to appear. The free ends of the housings 76 are open, and each housing also contains an aperture 78 (FIG. 6) adjacent to the valve seat 64.

Slidably mounted in each gas valve housing 76 is a gas valve member which comprises a valve element 80 and a permanent magnet actuator 82, each valve element 80 being adapted to engage its adjacent valve seat 64. In the preferred construction, each valve actuator is a permanent magnet of cylindrical shape, which is rolled in "Teflon" material or a similar plastic meterial which has a very low coefficient or friction.

Also fastened to the inner face of the end portion are four permanent magnets 84 (FIGS. 5 and 6) which are positioned in close proximity with the gas valve housings 76 and the liquid valve housing 66, whereby the respective valve members are yieldably maintained in the closed position shown in FIG. 2.

Fastened in the free end of the liquid valve housing 66, as by a friction fit, is the outer end of a tubular connector 86 (FIGS. 2 and 3), the inner end of which is received in the outer end of the siphon tube 46 with an O-ring 88 therebetween to provide a sliding, sealing engagement, for a purpose to appear. The outer end of the tubular connector 86 is preferably provided with an O-ring 90 for sealing engagement with the liquid valve housing 66, although this is not necessary if there is a close friction fit between these two members.

A flange member 92 is fastened on the tubular connector 86 a short distance from the outer end thereof, to provide a stop for engagement with the free end of the liquid valve housing 66. As will be described more fully hereinafter, the flange member 92 also limits the movement of the gas valve actuators 82 within the gas valve housings 76 (FIG. 3).

A coiled spring 94 is positioned about the tubular connector 86, with one end thereof in engagement with the flange member 92 and the other end in engagement with the flange 44 of the siphon tube 46.

FIGS. 7 and 8 show alternative constructions for removably fastening a tubular connector (similar in construction to connector 86) to the liquid valve housing 66, and also show alternative constructions for the liquid valve actuators. FIG. 7 modified parts have the same numbers as in FIGS. 2 and 3, followed with the latter "*a*", and in FIG. 8, the modified part numbers are followed by the letter "*b*".

Referring first to FIG. 7, the flange member 92a is fastened to the end of a tubular connector 86a as by welding, and includes a tubular extension 100 of reduced diameter, such that it is spaced from the inner surface of the liquid valve housing 66, and also includes a transversely extending wall 102, liquid passage ports 104, and a small escape port 106. An O-ring 108 is provided to effect a seal with the liquid valve housing 66.

The construction of the valve element 70 is the same as previously described, but the valve actuator 72a comprises a permanent magnet of cylindrical shape, which has been rolled in "Teflon" material or a similar plastic material having a low coefficient of friction. This type of construction obviates the radially extending projections 74 shown in FIGS. 2 and 3, and appreciably reduces the cost of the valve actuator.

Referring to FIG. 8, the outer end of a modified tubular connector 86b is provided with a similar flange member 92b, but the end of the connector is rolled at 110 to provide a groove for receiving an O-ring 112, and terminates in a portion 114 of reduced diameter which receives one end of a small tubular member 116.

The portion 114 contains relatively large liquid passage ports 118.

As in the construction shown in FIG. 7, the valve element 70 in FIG. 8 is similar in construction to the valve elements shown in FIGS. 2 and 3, but the valve actuator 72b is a permanent magnet of cylindrical shape, rolled in "Teflon" material or the like.

The inner end of the tubular member 116 is cut to provide projections 120 which are bent inwardly to provide stop members to limit the inward movement of the valve actuator 72b.

In use, when a beer keg provided with the subject washing, filling and tapping valve assembly is returned to the brewery, any beer remaining in the keg is in the liquid state inasmuch as the keg is sealed as illustrated in FIG. 2, whereby the remaining beer can be easily and quickly flushed from the keg. This materially reduces the amount of caustic cleaning materials which are normally required to remove the caked residue in open kegs.

In preparing the keg for cleaning and refilling, it is placed in the position illustrated in FIG. 1, i.e. with the bung opening 12 directed downwardly. A wash hose with an actuating arm or fixture (not shown) is connected to the flange 28 utilizing the groove 30, and water an cleansing materials are introduced into the keg under pressure. The actuating arm engages the bayonet portion 56 and forces the valve body 48 to the position illustrated in FIG. 3, with the coiled spring 94 being compressed by the flange 92 and with the tubular connector 86 telescoping into the siphon tube 46. The movement of the valve body 48 is stopped when the O-ring 54 engages the shoulder 32.

As shown in FIG. 3, the water and cleansing materials pass into the valve housing 20 through the opening in the flange 28, and thence through the large openings 34 and into the interior of the keg. The cleansing water also passes through the large openings 41 and around the tubular connector 86 and spring 94, thereby cleansing these portions of the device.

The cleansing water passing through the gas passageways 62 force the gas valve members 80-82 to the open position illustrated in FIG. 3, with the ends of the permanent magnet actuators 82 engaging the flange 92. In this open position, cleansing water passes through the gas passageways 62, around the valve elements 80, through the ports 78 and also around the cylindrical permanent magnet actuators 82, thereby cleansing all of these portions of the device.

In addition, the water entering the liquid passageway 58, forces the liquid valve member 72 to the open position with the one set of projections 74 engaging the outer end of the tubular connector 86, whereby the cleansing water passes through the liquid passageway 58, around the permanent magnet actuator 72, through the tubular connector 86, through the siphon tube 46 and into the interior of the keg, thereby cleansing all of these parts of the assembly.

It will be readily apparent that with the skeletal-type valve housing 20 with all of the internal parts exposed to the cleansing water, it is relatively easy to fully cleanse all of the working parts of the assembly.

In one system of operation, the wash hose is disconnected but the actuating arm remains in position, whereby the cleansing water is permitted to drain from the keg.

In another system, after the keg 16 has been filled with water and cleansing materials, the aforementioned water hose and actuating arm are disconnected. The coiled spring 94 moves the valve body 48 to the closed position illustrated in FIG. 2, and the permanent magnets 84 cause the permanent magnet actuators 72 and 82 to move their respective valve elements to the closed position.

The keg 16 then moves to the next station where the valve body 48 and the individual valve elements are moved to the open position by mechanical means, thereby permitting the water and cleansing materials to drain from the keg 16. If desired, heated air or steam can be blown into the keg through the opening in the flange 28, thereby completing the drying operation.

If desired, the interior of the keg can be inspected at this station, as by inserting a light and a conventional viewing assembly.

The keg 16 then moves to the beer filling station, where it continues to remain in the same relative position with the bung opening 12 in the downward direction.

The auxiliary equipment at this station differs from the equipment at the washing station in that the arm or fixture which engages the bayonet portion 56 includes a vent tube (not shown) which opens the liquid valve 60-70 and fits over the bayonet portion, whereby gas and/or air is vented from the keg through the siphon tube 46 during the filling operation.

In some breweries, a charge of carbon dioxide gas would be introduced into the keg to purge all air and bacteria therefrom, immediately prior to filling the keg with beer.

After the keg is filled with beer, the auxiliary filling equipment is removed, thereby permitting the spring 94 to move the valve body 48 to the closed position illustrated in FIG. 2, with the O-ring 54 engaging the shoulder 30, and with the permanent magnet actuators 72 and 82 moving their respective valve elements 70 and 80 to the closed position.

Thus, the beer-filled keg 16 is completely sealed and the normal residual gas pressure in the keg, which is from about 9 pounds per square inch to about 34 pounds per square inch, further aids in maintaining the valve body and the various valves in the closed position.

Accordingly, the keg can then be transported to a restaurant or tavern, in a clean and beer-filled condition, and without any concern regarding "leakers."

Although it might be customary to set a keg on end in order to utilize the tapping equipment at the restaurant or tavern, the present keg 16 is positioned on its side with the flange 28 and bung opening 12 directed upwardly. This does not cause any problem whatsoever from a space standpoint because the length of substantially all of the beer kegs in use at the present time, is only a few inches greater than the diameter thereof. In short, even where the kegs are positioned under a counter for dispensing purposes, as differentiated from being positioned in a remote celler, tapping the keg through the side bung opening presents no space problem whatsoever.

To tap a keg 16 utilizing the subject valve assembly, a gas pressure hose (not shown) and a beer faucet hose (not shown) are easily and quickly interconnected with the aforementioned gas passageways and the liquid passageway in the valve assembly, as by means of a tapper which is shown and described in my co-pending application Ser. No. 189,281. With such an assembly, gas enters the keg through the gas passageways 62, thereby forcing the valve elements 80 to the open position, whereby the gas passes through the ports 78 (FIG. 6) and into the interior of the keg. The beer is then forced upwardly through the siphon tube 46, the tubular connector 86, and around the valve actuator 72 and the open valve element 70, and through the liquid passageway 58.

Turning to a consideration of the first modified construction shown in FIG. 7, it illustrates a simpler and a less expensive form of permanent magnet actuator 72a and a somewhat less restricted flow path for liquid through the liquid valve housing 66. Thus, the liquid flowing through the valve housing 66 and the siphon tube 86a passes through the ports 104 and around the tubular member 100. The small escape port 106 permits the passage of any liquid or air which is trapped in the tubular member 100, as the permanent magnet actuator 72a moves from the closed to the open position and contacts the transversely extending wall portion 102.

In the second modified construction illustrated in FIG. 8, the liquid also flows through ports 118 and around the tubular member 116, with the permanent magnet actuator 72b being of similar simple construction and with the inward movement thereof limited by the tabs 120.

Thus, it is apparent that there has been provided a novel washing, filling and tapping valve assembly, with two alternate forms of liquid valve constructions, which fulfills all of the objects and advantages sought therefor, and which completely obviates the need for a plug or bung and which utilizes existing cooperage. Furthermore, in addition to substantially eliminating the usual 0.5 percent to 1 percent "leakers," the subject valve assembly appreciably reduces the number of steps or operations in washing and in filling a keg with beer, and increases the capacity of present breweries approximately tenfold, with less personnel than presently being used.

I claim:

1. A valve assembly for mounting in an opening contained in the wall of a keg, comprising:
    a tubular valve housing having one end thereof adapted to be supported in said opening and including one internal shoulder adjacent said one end;
    a plurality of openings in said housing adjacent said shoulder to provide communication with the interior of the keg;
    a valve body having an end portion mounted in said housing for limited axial movement therein relative to said one internal shoulder, between a closed position in which said end portion is in sealing engagement with the shoulder and an open position in which it is spaced therefrom, the openings in the housing being unobstructed when said valve body is in the open position;
    a liquid passageway and a gas passageway in the valve body for communication with the interior of a keg, each of which passageways contains a valve seat;
    a valve element associated with each valve seat and yieldably biased toward said seat by an actuator;
    an elongated siphon tube having one end thereof interconnected with said valve body and in communication with the liquid passageway therein; and
    yieldable means biasing the valve body toward the closed position.

2. A valve assembly according to claim 1, in which each valve actuator comprises a permanent magnet of cylindrical shape positioned in a tubular housing which is interconnected with the end portion of the valve body.

3. A valve assembly according to claim 2, in which the actuator associated with the gas passageway has a permanent covering of a material with a relatively low coefficient of friction, and the actuator is in sliding engagement with the inner surface of the tubular housing which receives it.

4. A valve assembly according to claim 1, in which the actuator for the liquid passageway valve element is positioned in a tubular housing which has one end thereof interconnected with the end portion of the valve body and the other end of said tubular housing is interconnected with said one end of the siphon tube.

5. A valve assembly according to claim 1 in which:
    the valve housing has another end opposite from said one end, which receives and supports said one end of the siphon tube;
    the actuator for the liquid passageway valve element is positioned in a tubular housing which has one end thereof connected to the end portion of the valve body; and
    a tubular connector extends between and is in communication with said tubular housing and the siphon tube.

6. A valve assembly according to claim 5 in which the tubular connector is removably connected to the tubular housing and is in telescoping engagement with the siphon tube.

7. A valve assembly according to claim 6 in which the tubular connector contains a flange member adjacent to the tubular housing to limit the movement of the connector relative thereto, and a coiled spring is positioned about the tubular connector with one end of the spring in engagement with the flange and the other end in engagement with said other end of the valve housing.

8. A valve assembly according to claim 1 in which:
    the end portion of the valve body is disc-like and contains a central liquid passageway and a plurality of gas passageways adjacent thereto, each of said passageways containing a valve seat;
    each of said valve actuators is a permanent magnet which is positioned in a tubular housing which has one end thereof connected to said end portion in communication with one of said passageways; and
    permanent magnets are mounted between said tubular housings.

9. A valve assembly according to claim 8 in which each of the tubular housings in communication with a gas passageway contains an opening in the wall thereof adjacent to the valve seat, which opening is unobstructed when the valve element associated with said valve seat is spaced therefrom in an open position.

10. A valve assembly according to claim 1, which further includes:
    a flange portion adjacent said one end of the valve housing for engagement with the outer wall surface of the keg adjacent said opening; and an annular resilient member positioned about the valve body and spaced from said flange portion, for engagement with the inner wall surface of the keg adjacent said opening.

11. A valve assembly according to claim 1, which further includes:
another internal shoulder in the tubular valve housing, spaced from said one shoulder, limiting the movement of the valve body away from said one internal shoulder.

12. A valve assembly according to claim 11, which further includes:
an annular resilient member mounted on said valve body for sealing engagement with the one internal shoulder when the valve body is in the closed position, and for sealing engagement with said other internal shoulder when the valve body is in the open position.

* * * * *